United States Patent
Cavalieri et al.

(10) Patent No.: US 9,988,522 B2
(45) Date of Patent: Jun. 5, 2018

(54) TRANSPARANT POLYOLEFIN COMPOSITIONS

(75) Inventors: Claudio Cavalieri, Ferrara (IT); Monica Galvan, S. Maria Maddalena (IT)

(73) Assignee: Basell Poliolefine Italia S.r.l., Milan (IT)

( * ) Notice: Subject to any disclaimer, the term of this patent is extended or adjusted under 35 U.S.C. 154(b) by 590 days.

(21) Appl. No.: 12/734,789

(22) PCT Filed: Nov. 25, 2008

(86) PCT No.: PCT/EP2008/066103
§ 371 (c)(1),
(2), (4) Date: May 24, 2010

(87) PCT Pub. No.: WO2009/077293
PCT Pub. Date: Jun. 25, 2009

(65) Prior Publication Data
US 2010/0230377 A1    Sep. 16, 2010

Related U.S. Application Data

(60) Provisional application No. 61/008,478, filed on Dec. 20, 2007.

(30) Foreign Application Priority Data

Dec. 18, 2007   (EP) .................... 07150082

(51) Int. Cl.
| C08L 23/10 | (2006.01) |
| C08L 23/20 | (2006.01) |
| C08L 23/22 | (2006.01) |
| C08K 5/00 | (2006.01) |
| C08K 5/14 | (2006.01) |

(52) U.S. Cl.
CPC .............. *C08L 23/10* (2013.01); *C08K 5/005* (2013.01); *C08K 5/0083* (2013.01); *C08K 5/14* (2013.01); *C08L 23/20* (2013.01); *C08L 23/22* (2013.01); *Y10T 428/1352* (2015.01)

(58) Field of Classification Search
CPC .......... C08L 23/10; C08L 23/20; C08L 23/22; C08L 2666/06; C08L 2666/08; C08K 5/005; C08K 5/0083; C08K 5/14; Y10T 428/1352

USPC .......................... 524/123, 518, 528
See application file for complete search history.

(56) References Cited

U.S. PATENT DOCUMENTS

| 4,399,054 A | 8/1983 | Ferraris et al. |
| 4,469,648 A | 9/1984 | Ferraris et al. |
| 5,290,635 A * | 3/1994 | Matsumura et al. ......... 428/516 |
| 5,310,950 A | 5/1994 | Mannion |
| 2004/0122196 A1* | 6/2004 | Pierini et al. ................ 526/351 |

FOREIGN PATENT DOCUMENTS

| CN | 1659030 | 8/2005 |
| EP | 45977 | 2/1982 |
| EP | 361494 | 4/1990 |
| EP | 395083 | 10/1990 |
| EP | 499669 | 8/1992 |
| EP | 557953 | 9/1993 |
| EP | 728769 | 8/1996 |
| EP | 782587 | 7/1997 |
| EP | 1272533 | 1/2003 |
| JP | 2002201321 | 7/2002 |
| JP | 2002275277 | 9/2002 |
| JP | 2007169595 | 7/2007 |
| JP | 2008524361 | 7/2008 |
| WO | 98/44009 | 10/1998 |
| WO | 99/45043 | 9/1999 |
| WO | 00/63261 | 10/2000 |
| WO | 03/042258 | 5/2003 |
| WO | 03/099883 | 12/2003 |
| WO | 2004/048424 | 6/2004 |
| WO | WO 2006010414 A1 * | 2/2006 ............. C08L 23/12 |
| WO | WO2006067043 | 6/2006 |

OTHER PUBLICATIONS

Chinese Office Action—Mailed Nov. 23, 2011 for Corresponding Application No. 2008801206023.
Japanese Office Action—Mailed Oct. 2, 2012 for Corresponding Application NO. 2010-538534.
Japanese Office Action—Mailed May 16, 2013 for Corresponding Application No. 2010-538534.

* cited by examiner

Primary Examiner — Angela C Scott

(57) ABSTRACT

A polyolefin composition having good transparency and mechanical properties comprising, all percent amounts being by weight: A) from 70 to 98% of a propylene homopolymer or copolymer having haze of 25% or less and melting temperature of 130° C. or higher; and B) from 2 to 30% of a butene-1 copolymer containing from 0.5 to 30% of one or more comonomer(s).

7 Claims, No Drawings

TRANSPARANT POLYOLEFIN COMPOSITIONS

This application claims priority to European Patent Application 07150082.1 filed 18 Dec. 2007 and provisional U.S. Appl. No. 61/008,478 filed 20 Dec. 2007; the disclosures of European Application 07150082.1 and U.S. Appl. No. 61/008,478, each as filed, are incorporated herein by reference.

The present invention relates to a transparent polyolefin composition having a valuable balance of optical and mechanical properties and particularly suited for preparing injection molded articles.

In particular, the composition of the present invention shows an unusual balance of impact resistance, tensile properties and transparency (low haze).

It is known in the art that to modify the properties of polypropylene, in particular the flexibility and the impact resistance, it is possible to add a certain quantity of elastomeric olefin copolymer to the polypropylene, such as ethylene-propylene rubber (EPR) for example, but since the refraction index for EPR is different from that for polypropylene, said polyolefin blends are usually opaque, even when both components are transparent initially.

To overcome such problem it has been proposed, as disclosed in EP-A-0557953, to add certain amounts of ethylene polymers to the said blends of polypropylene with elastomeric olefin copolymers.

It has now been found that a valuable balance of properties, as previously said, with particular reference to haze and tensile properties, is achieved by blending propylene polymers with butene copolymers.

Thus the present invention provides a polyolefin composition having good transparency and mechanical properties comprising, all percent amounts being by weight:

A) from 70 to 98%, preferably from 80 to 98%, more preferably from 82 to 98%, of a propylene homopolymer or copolymer having haze of 25% or less, preferably of 23% or less, and melting temperature of 130° C. or higher, preferably of 135° C. or higher, more preferably of 140° C. or higher; and B) from 2 to 30%, preferably from 2 to 20%, more preferably from 2 to 18%, of a butene-1 copolymer containing from 0.5 to 30%, preferably from 0.5 to 18%, more preferably from 0.5 to 15% of one or more comonomer(s).

The said haze values are measured on 1 mm thick specimens.

The said melting temperature values are determined by differential scanning calorimetry, according to ASTM D 3417, with a heating rate of 20° C./minute.

In such compositions, when (A) is a propylene copolymer, it contains one or more comonomer(s) preferably selected from ethylene and $CH_2=CHR$ α-olefins, where R is a $C_2$-$C_8$ alkyl radical.

Specific examples of the said α-olefins are butene-1, pentene-1, 4-methyl-pentene-1, hexene-1 and octene-1.

Ethylene, butene-1 and hexene-1 are preferred.

The comonomer(s) in the butene-1 copolymer (B) are preferably selected from ethylene, propylene and $CH_2=CHR$ α-olefins, where R is a $C_3$-$C_8$ alkyl radical.

Specific examples of the said α-olefins are pentene-1, 4-methyl-pentene-1, hexene-1 and octene-1.

Ethylene and propylene are preferred.

From the above definitions it is evident that the term "copolymer" includes polymers containing more than one kind of comonomers.

Other preferred features for the propylene homopolymer or copolymer (A) are:

Content of comonomer(s), when (A) is a copolymer, from 0.5 to 15% by weight, more preferably from 1 to 12% by weight, in particular from 0.5 to 6% by weight when the comonomer is ethylene or hexene-1;

Polydispersity Index (P.I.) equal to or higher than 4, specifically from 4 to 20, more preferably from 4 to 15;

Melt Flow Rate (MFR, measured according to ASTM D 1238 at 230° C. with a load of 2.16 kg) from 1 to 100 g/10 min. in particular from 8 to 50 g/10 min.;

Amount of fraction insoluble in xylene at room temperature equal to or higher than 85% by weight, more preferably equal to or higher than 90% by weight, in particular, in the case of propylene homopolymers, equal to or higher than 95% by weight;

Flexural modulus higher than 600 MPa, more preferably higher than 900 MPa.

The propylene homopolymer or copolymer (A) used in the present invention can be prepared by polymerisation in one or more polymerisation steps. Such polymerisation can be carried out in the presence of Ziegler-Natta catalysts.

Preferably, the polymerization is carried out in the presence of a highly stereospecific heterogeneous Ziegler-Natta catalyst.

Said Ziegler-Natta catalysts comprise a solid catalyst component comprising at least one titanium compound having at least one titanium-halogen bond, and at least an electron-donor compound (internal donor), both supported on magnesium chloride. The Ziegler-Natta catalysts systems further comprise an organo-aluminum compound as essential co-catalyst and optionally an external electron-donor compound.

Suitable catalysts systems are described in the European patent applications EP45977, EP361494, EP728769, EP 1272533 and in the international patent application WO00/63261. Preferably, the solid catalyst component comprises Mg, Ti, halogen and an electron donor selected from esters of mono or polycarboxylic acids which can be either aliphatic or aromatic. Among esters of aliphatic acids, preferred are malonates, glutarates and particularly preferred are the succinates of formula (I):

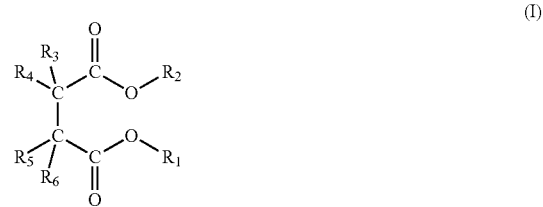

wherein the radicals $R_1$ and $R_2$, equal to or different from each other, are a $C_1$-$C_{20}$ linear or branched alkyl, alkenyl, cycloalkyl, aryl, arylalkyl or alkylaryl group, optionally containing heteroatoms; the radicals $R_3$ to $R_6$ equal to or different from each other, are hydrogen or a $C_1$-$C_{20}$ linear or branched alkyl, alkenyl, cycloalkyl, aryl, arylalkyl or alkylaryl group, optionally containing heteroatoms, and the radicals $R_3$ to $R_6$ which are joined to the same carbon atom can be linked together to form a cycle.

$R_1$ and $R_2$ are preferably $C_1$-$C_8$ alkyl, cycloalkyl, aryl, arylalkyl and alkylaryl groups. Particularly preferred are the compounds in which $R_1$ and $R_2$ are selected from primary alkyls and in particular branched primary alkyls.

Examples of suitable $R_1$ and $R_2$ groups are methyl, ethyl, n-propyl, n-butyl, isobutyl, neopentyl, 2-ethylhexyl. Particularly preferred are ethyl, isobutyl, and neopentyl.

One of the preferred groups of compounds described by the formula (I) is that in which $R_3$ to $R_5$ are hydrogen and $R_6$ is a branched alkyl, cycloalkyl, aryl, arylalkyl and alkylaryl radical having from 3 to 10 carbon atoms. Another preferred group of compounds within those of formula (I) is that in which at least two radicals from $R_3$ to $R_6$ are different from hydrogen and are selected from $C_1$-$C_{20}$ linear or branched alkyl, alkenyl, cycloalkyl, aryl, arylalkyl or alkylaryl group, optionally containing heteroatoms. Particularly preferred are the compounds in which the two radicals different from hydrogen are linked to the same carbon atom. Furthermore, also the compounds in which at least two radicals different from hydrogen are linked to different carbon atoms, that is $R_3$ and $R_5$ or $R_4$ and $R_6$ are particularly preferred Among esters of aromatic acids preferred are benzoates and phthalates disclosed in EP45977 and in particular diisobutylphathalate or dihexylphthalate or diethylphthalate and mixtures thereof.

According to a preferred method, the solid catalyst component can be prepared by reacting a titanium compound of formula $Ti(OR)_{n-y}X_y$, where n is the valence of titanium and y is a number between 1 and n, preferably $TiCl_4$, with a magnesium chloride deriving from an adduct of formula $MgCl_2 \cdot pROH$, where p is a number between 0.1 and 6, preferably from 2 to 3.5, and R is a hydrocarbon radical having 1-18 carbon atoms. The adduct can be suitably prepared in spherical form by mixing alcohol and magnesium chloride in the presence of an inert hydrocarbon immiscible with the adduct, operating under stirring conditions at the melting temperature of the adduct (100-130° C.). Then, the emulsion is quickly quenched, thereby causing the solidification of the adduct in form of spherical particles. Examples of spherical adducts prepared according to this procedure are described in U.S. Pat. Nos. 4,399,054 and 4,469,648. The so obtained adduct can be directly reacted with the Ti compound or it can be previously subjected to thermal controlled dealcoholation (80-130° C.) so as to obtain an adduct in which the number of moles of alcohol is generally lower than 3, preferably between 0.1 and 2.5. The reaction with the Ti compound can be carried out by suspending the adduct (dealcoholated or as such) in cold $TiCl_4$ (generally 0° C.); the mixture is heated up to 80-130° C. and kept at this temperature for 0.5-2 hours. The treatment with $TiCl_4$ can be carried out one or more times. The internal donor can be added during the treatment with $TiCl_4$ and the treatment with the electron donor compound can be repeated one or more times. Generally, the succinate of formula (I) is used in molar ratio with respect to the $MgCl_2$ of from 0.01 to 1 preferably from 0.05 to 0.5. The preparation of catalyst components in spherical form is described for example in European patent application EP-A-395083 and in the International patent application WO98/44009. The solid catalyst components obtained according to the above method show a surface area (by B.E.T. method) generally between 20 and 500 m²/g and preferably between 50 and 400 m²/g, and a total porosity (by B.E.T. method) higher than 0.2 cm³/g preferably between 0.2 and 0.6 cm³/g. The porosity (Hg method) due to pores with radius up to 10.000 Å generally ranges from 0.3 to 1.5 cm³/g, preferably from 0.45 to 1 cm³/g.

The organo-aluminum compound is preferably an alkyl-Al selected from the trialkyl aluminum compounds such as for example triethylaluminum, triisobutylaluminum, tri-n-butylaluminum, tri-n-hexylaluminum, tri-n-octylaluminum. It is also possible to use mixtures of trialkylaluminum compounds with alkylaluminum halides, alkylaluminum hydrides or alkylaluminum sesquichlorides such as $AlEt_2Cl$ and $Al_2Et_3Cl_3$.

The organo-aluminum compound is generally used in such a quantity that the Al/Ti ratio be from 1 to 1000.

Preferred external electron-donor compounds include silicon compounds, ethers, esters such as ethyl 4-ethoxybenzoate, amines, heterocyclic compounds and particularly 2,2,6,6-tetramethyl piperidine, ketones and the 1,3-diethers. Another class of preferred external donor compounds is that of silicon compounds of formula $R_a^5R_b^6Si(OR^7)_c$, where a and b are integer numbers from 0 to 2, c is an integer from 1 to 3 and the sum (a+b+c) is 4; $R^5$, $R^6$, and $R^7$, are alkyl, cycloalkyl or aryl radicals with 1-18 carbon atoms optionally containing heteroatoms. Particularly preferred are methylcyclohexyldimethoxysilane, diphenyldimethoxysilane, methyl-t-butyldimethoxysilane, dicyclopentyldimethoxysilane, 2-ethylpiperidinyl-2-t-butyldimethoxysilane, 1,1,1,trifluoropropyl-2-ethylpiperidinyl-dimethoxysilane and 1,1,1, trifluoropropyl-metil-dimethoxysilane. The external electron donor compound is used in such an amount to give a molar ratio between the organo-aluminum compound and said electron donor compound of from 0.1 to 500.

The catalysts generally used to produce the propylene homopolymer or copolymer (A) are capable of producing polypropylene with a value of xylene insolubility at room temperature greater than 90% wt, preferably greater than 95% wt.

The polymerisation process used to prepare the propylene homopolymer or copolymer (A) can occur in liquid phase (e.g. using liquid propylene as diluent), in gas phase or liquid-gas phase.

The reaction temperature is preferably from 40 to 120° C.; more preferably, the reaction temperature ranges from 50 to 80° C.

The pressure, if the polymerisation is carried out in liquid propylene, is the one which competes with the vapor pressure of the liquid propylene at the operating temperature used, and it may be modified by the vapor pressure of the small quantity of inert diluent used to feed the catalyst mixture, by the overpressure of optional monomers and by the hydrogen used as molecular weight regulator.

The polymerisation pressure can be atmospheric or higher. Conventional molecular weight regulators known in the art, such as chain transfer agents (e.g. hydrogen or $ZnEt_2$), may be used.

In particular, the propylene homopolymer or copolymer (A) can be produced by a polymerisation process carried out in a gas-phase polymerization reactor comprising at least two interconnected polymerisation zones.

The process according to the preferred polymerisation process is illustrated in EP application 782 587.

In detail, the process is carried out in a first and in a second interconnected polymerization zones into which propylene and the optional comonomers are fed in the presence of a catalyst system and from which the polymer produced is discharged. In said process the growing polymer particles flow upward through one (first) of the said polymerisation zones (riser) under fast fluidisation conditions, leave said riser and enter another (second) polymerisation zone (downcomer) through which they flow downward in a densified form under the action of gravity, leave said downcomer and are reintroduced into the riser, thus establishing a circulation of polymer between the riser and the downcomer.

In the downcomer high values of density of the solid are reached, which approach the bulk density of the polymer. A positive gain in pressure can thus be obtained along the direction of flow, so that it becomes possible to reintroduce the polymer into the riser without the help of special mechanical means. In this way, a "loop" circulation is set up, which is defined by the balance of pressures between the two polymerisation zones and by the head loss introduced into the system.

Generally, the condition of fast fluidization in the riser is established by feeding a gas mixture comprising the relevant monomers to said riser. It is preferable that the feeding of the gas mixture is effected below the point of reintroduction of the polymer into said riser by the use, where appropriate, of gas distributor means. The velocity of transport gas into the riser is higher than the transport velocity under the operating conditions, preferably from 2 to 15 m/s.

Generally, the polymer and the gaseous mixture leaving the riser are conveyed to a solid/gas separation zone. The solid/gas separation can be effected by using conventional separation means. From the separation zone, the polymer enters the downcomer. The gaseous mixture leaving the separation zone is compressed, cooled and transferred, if appropriate with the addition of make-up monomers and/or molecular weight regulators, to the riser. The transfer can be carried out by means of a recycle line for the gaseous mixture.

The control of the polymer circulation between the two polymerisation zones can be carried out by metering the amount of polymer leaving the downcomer using means suitable for controlling the flow of solids, such as mechanical valves.

The operating parameters, such as the temperature, are those that are usual in olefin polymerisation process, for example between 50 to 120° C.

The process can be carried out under operating pressures of between 0.5 and 10 MPa, preferably between 1.5 to 6 MPa.

Optionally, one or more inert gases, such as nitrogen or an aliphatic hydrocarbon, are maintained in the polymerization zones, in such quantities that the sum of the partial pressures of the inert gases is preferably between 5 and 80% of the total pressure of the gases.

The various catalysts are fed up to the riser at any point of the said riser. However, they can also be fed at any point of the downcomer. The catalyst can be in any physical state, therefore catalysts in either solid or liquid state can be used.

The propylene homopolymer or copolymer (A) is generally blended with a clarifying agent, to achieve the said haze value of 25% or less.

With the term "clarifying agent" it is intended any additive which gives rise to polymer crystallites so small that they scatter significantly less visible light and hence optically clear polyolefin parts can be obtained.

Usually, said clarifying agents belong to the class of nucleating agents.

Suitable clarifying agents include the acetals of sorbitols and xylitols as well as phosphate ester salts. Many such clarifying agents are disclosed in U.S. Pat. No. 5,310,950. Specific examples of acetals of sorbitols include dibenzylidenesorbitol or its $C_1$-$C_8$-alkyl-substituted derivatives such as methyldibenzylidenesorbitol, ethyldibenzylidenesorbitol or dimethyldibenzylidenesorbitol. Examples of suitable commercially available sorbitol-acetal clarifying agents are those designated as Millad 3940 and Millad 3988, both available from Milliken Chemical. Specific examples of phosphate ester salts include 2,2'-methylenebis(4,6,-di-tert-butylphenyl)phosphate sodium or lithium salt. Examples of commercially available phosphate ester salts for use as clarifying agents include ADK stabilizer NA-71 and ADK Stabilizer NA-21, both available from Amfine Chemical Corp. Particularly preferred clarifying agents are 3,4-dimethyldibenzylidenesorbitol; aluminum-hydroxy-bis[2,2'-methylene-bis(4,6-di-t-butylphenyl)phosphate]; sodium 2,2'-methylene-bis(4,6-ditertbutylphenyl)phosphate and other clarifying agents different from sorbitols and phosphate ester salts such as N,N',N''-tris-isopentyl-1,3,5-benzene-tricarboxoamide, bicyclo[2.2.1]heptane-2,3-dicarboxylic acid disodium or calcium salt (1R,2R,3R,4S) or the commercial nucleating agent NJ Star PC1. Combinations of any of the above may also be employed.

The clarifying agent may be added to the propylene homopolymer or copolymer (A) by known methods, such as by melt blending the clarifying agent and the propylene homopolymer or copolymer (A) under shear condition in a conventional extruder.

Preferably, the propylene homopolymer or copolymer (A) comprises up to 2500 ppm, more preferably from 100 to 2000 ppm by weight, of at least one clarifying agent. Such amounts are referred to the total weight of the polymer and the clarifying agent.

The butene-1 copolymer (B) is preferably a crystalline or semicrystalline isotactic polymer with an isotactic index of at least 60%. Said isotactic index is determined both as mmmm pentads/total pentads using $^{13}$C-NMR and as quantity by weight of matter soluble in xylene at 0° C.

Other preferred features for the butene-1 copolymer (B) are:

Melt Flow Rate (MFR, measured according to ASTM D 1238 at 190° C. with a load of 2.16 kg) from 1 to 100 g/10 min. in particular from 0.5 to 50 g/10 min.;

Density from 0.90 to 0.88 g/cm$^3$, measured for instance according to ASTM D 1505.

Said butene-1 copolymer can be obtained using known processes and polymerization catalysts; for example, the copolymerization of butene-1 can be carried out using Ziegler-Natta catalysts.

As a way of example, in order to produce the butene-1 polymers described above one can use TiCl$_3$ based catalysts, and aluminum derivatives, such as aluminum halides for example, as cocatalysts, as well as the catalytic systems above described for the preparation of the propylene homopolymer or copolymer (A). The polymerization process can be carried out according to known techniques, for example slurry polymerization using as diluent a liquid inert hydrocarbon, or solution polymerization using for example the liquid butene-1 as a reaction medium. Moreover, it may also be possible to carry out the polymerization process in the gas-phase, operating in one or more fluidized or mechanically agitated bed reactors. The polymerization carried out in the liquid butene-1 as a reaction medium is highly preferred.

Examples of the said butene-1 copolymer and of processes for its preparation are disclosed in WO9945043, WO03099883 and in WO2004048424.

As disclosed for instance in WO03042258, the butene-1 copolymer can also be prepared by polymerization in the presence of catalysts obtained by contacting a metallocene compound with an alumoxane.

The composition of the present invention can also contain additives, fillers and pigments commonly used for olefin polymers, such as, for example, nucleating agents (such as micronized talc), extension oils, mineral fillers, organic and inorganic pigments.

Preferred features for the composition of the present invention are:

Haze values equal to or lower than 25%;

Melt Flow Rate (MFR, measured according to ASTM D 1238 at 230° C. with a load of 2.16 kg) from 1 to 100 g/10 min. in particular from 5 to 50 g/10 min.;

Flexural modulus higher than 500 MPa, more preferably higher than 800 MPa;

Elongation at break higher than 500%.

The composition of the present invention can be prepared according to known methods, by blending the propylene homopolymer or copolymer (A) and the butene-1 copolymer (B) at temperatures higher than their melting or softening point, thus preferably at a temperature from 150 to 250° C. Other components and additives can be added during the said blending process. It is possible to use blending apparatuses usually employed in the art, as Banbury mixers or screw extruders.

It is also possible to prepare the total composition directly in polymerization with at least two sequential polymerization steps, where (A) and (B) are prepared separately in one or more steps.

The desired MFR values for the polymer components (A) and (B) and for the composition of the invention can be obtained directly in polymerization, by adequately regulating the molecular weight regulator (hydrogen, for example), or can be obtained by subjecting said polymer components or composition to visbreaking. Said polymer chain scissioning or visbreaking is carried out by using well known techniques. One of them consists of using peroxides which are added in sufficient quantities to the polymer to provide the desired degree of visbreaking, upon heating, generally in an extruder.

The peroxides which are most conveniently used in the polymer visbreaking process have a decomposition temperature preferably ranging from 150° C. to 250° C. Examples of said peroxides are di-tert-butyl peroxide, dicumyl peroxide, 2,5-dimethyl-2,5-di(tert-butylperoxy)hexyne and Luperox 101 2,5-dimethyl-2,5-di(tert-butylperoxy)hexane, all of which are commercially available.

The quantity of peroxide necessary for the visbreaking process preferably ranges from 0.001 to 0.5% by weight of the polymer, more preferably from 0.001 to 0.2%.

As previously mentioned, the compositions of the present invention are particularly suited for preparing injection molded articles, injection blow molded and injection stretch blow molded articles, like formed articles in general (for instance housewares), bottles and containers.

Thus the present invention provides also an injection molded article comprising the said composition. Such injection molded article is preferably characterized by a wall thickness equal to or greater than 0.1 mm, more preferably equal to or greater than 0.5 mm.

The injection molded article is typically prepared by using processes and apparatuses well known in the art. Generally the injection molding process comprises a step where the polymer is molten and a subsequent step where the molten polymer is injected in the mold under pressure. It is also possible to produce an injection molded tubular structure and to blow air into it while softened at a suited temperature, in order to force the softened tube to conform to the inside walls of the mold.

Temperatures and pressures are those usually employed in the injection molding processes. In particular it is possible to operate at melt temperatures from 180 to 230° C. with injection pressures from 1 to 150 MPa.

The following not-limiting examples are given to better illustrate the present invention.

The following characterization methods are used to test the polymer materials.

Determination of the comonomer content: by infrared spectroscopy (IR spectroscopy).

Melting temperature: Determined by differential scanning calorimetry (DSC) according to ISO 11357/3 method.

A sample weighting 6±1 mg, is heated to 200±1° C. at a rate of 20° C./min and kept at 200 ±1° C. for 2 minutes in nitrogen stream and it is thereafter cooled at a rate of 20° C./min to 40 ±2° C., thereby kept at this temperature for 2 min to crystallise the sample. Then, the sample is again fused at a temperature rise rate of 20° C./min up to 200° C.±1. The melting scan is recorded, a thermogram is obtained, and, from this, temperatures corresponding to peaks are read. The temperature corresponding to the most intense melting peak recorded during the second fusion is taken as the melting temperature.

Melt Flow Rate (MFR): Determined according to ASTM D1238, condition L (230° C./2.16 kg load) for propylene polymers and copolymers, and according to ASTM D1238, condition E (190° C./2.16 kg load) for butene-1 copolymers.

Polydispersity Index (P.I.): Determined at a temperature of 200° C. by using a parallel plates rheometer model RMS-800 marketed by RHEOMETRICS (USA), operating at an oscillation frequency which increases from 0.1 rad/sec to 100 rad/sec. From the crossover modulus one can derive the P.I. by way of the equation:

$$P.I.=10^5/Gc$$

in which Gc is the crossover modulus which is defined as the value (expressed in Pa) at which G'=G" wherein G' is the storage modulus and G" is the loss modulus.

Haze (on 1 mm plaque):

Measured according to ASTM D 1003 on 1 mm plaque. According to the method used, 5×5 cm specimens are cut from molded plaques 1 mm thick and the haze value is measured using a Gardner photometric unit connected to a Hazemeter type UX-10 or an equivalent instrument having G.E. 1209 light source with filter "C". Reference samples of known haze are used for calibrating the instrument. The plaques to be tested are produced according to the following method. 75×75×1 mm plaques are molded with a GBF Plastiniector G235/90 Injection Molding Machine, 90 tons under the following processing conditions:

Screw rotation speed: 120 rpm
Back pressure: 10 bar
Melt temperature: 260° C.
Injection time: 5 sec
Switch to hold pressure: 50 bar
First stage hold pressure: 30 bar
Second stage pressure: 20 bar
Hold pressure profile: First stage 5 sec
  Second stage 10 sec
Cooling time: 20 sec
Mold water temperature: 40° C.

Izod impact resistance: Determined according to the ISO 180/1A method, at 0° C. and 23° C., after 48 hours.

Flexural elastic modulus (FEM) and Tensile elastic modulus (TEM): Determined according to the ISO 178 method, after 48 hours.

Tensile strength and elongation at yield and at break: Determined according to ISO 527, after 48 hours.

Heat distortion temperature (HDT): Determined according to ISO 75, after 48 hours.

Products Used in the Working Examples

PP-1 (component (A)): propylene homopolymer having the following features:
  melting temperature: 163° C.;
  MFR: 10.3 g/10 min.;
  P.I.: 7.3;
  haze: 21.8% (with clarifying agent);
  Izod at 0° C.: 1.3 kJ/g;
  Izod at 23° C.: 2.6 kJ/g;
  FEM: 1915 MPa
  TEM: 2220 MPa;
  Tensile strength at yield: 41 MPa;
  Elongation at yield: 7.1%;
  Tensile strength at break: 38.9 MPa;
  Elongation at break: 12%;
  HDT: 120.5° C.

PP-2 (component (A)): propylene/ethylene copolymer containing 1.5% by weight of ethylene, having the following properties:
  melting temperature: 157.8° C.;
  MFR: 2 g/10 min.;
  P.I.: 6;
  haze: 18% (with clarifying agent).

The said propylene polymers are prepared by polymerising propylene (PP-1) and copolymerizing propylene and ethylene (PP-2) in the presence of a catalyst under continuous conditions in a plant comprising a polymerisation apparatus.

The catalyst is sent to the polymerisation apparatus that comprises two interconnected cylindrical reactors, riser and downcomer. Fast fluidisation conditions are established in the riser by recycling gas from the gas-solid separator.

The catalyst employed comprises a catalyst component prepared by analogy with example 5 of EP-A-728 769 but using microspheroidal $MgCl_2.1.7C_2H_5OH$ instead of $MgCl_2.2.1C_2H_5OH$. Such catalyst component is used with dicyclopentyl dimethoxy silane (DCPMS) as external donor and with triethylaluminum (TEA).

The polymers show a broad distribution of the molecular weights obtained by using a liquid barrier. The high molecular weight fraction is polymerised in the downcomer, while the low molecular weight fraction is obtained in the riser.

The polymer particles exiting the reactor are subjected to a steam treatment to remove the reactive monomers and volatile substances and then dried. The polymer particles are extruded with a usual package of stabilisers, namely 0.05% by weight of calcium stearate and 0.15% by weight of Irganox B215 (pentaerithryl-tetrakis[3(3,5-di-tert-butyl-4-hydroxyphenyl]propionate and tris(2,4-ditert-butylphenyl) phosphite in the ratio of 1:1) and, in addition to such stabilizers, 0.18% by weight of a clarifying agent (Millad 3988, bis(3,4-dimethyldibenzylidene)sorbitol) and a peroxide, in a Werner extruder with a melt temperature of 215° C.

The peroxide is Luperox 101 (2,5-dimethyl-2,5-di(tert-butylperoxy)hexane) in amounts of 0.015% by weight for PP-1 and 0.02% by weight for PP-2.

The said weight amounts are referred to the total weight of the polymer and the additives.

PB-1 (component (B)): butene-1/ethylene copolymer containing 4.3% by weight of ethylene and having MFR of 1 g/10 min. It is a reactor blend of:
60% by weight of a butene-1/ethylene copolymer fraction containing 5.5% by weight of ethylene, and having a MFR of 0.24, and
40% by weight of a butene-1/ethylene copolymer fraction containing 2.6% by weight of ethylene.

Such reactor blend is prepared directly in polymerization, by preparing the two copolymer fractions in separate and consecutive polymerization stages, in the presence of a highly stereospecific Ziegler-Natta catalyst.

EPR (comparison component (B)): copolymer of ethylene with propylene, containing 18.5% by weight of ethylene and having a MFR (230° C./2.16 kg) of 10.

EXAMPLE 1 AND COMPARISON EXAMPLE 1

Preparation of the Polyolefin Compositions and Films

The polyolefin compositions used in the examples are blends made of the above described PP-1 and PP-2 polymers as component (A), and of the above described PB-1 copolymer and EPR as component (B) and comparison component (B) respectively. The blends are made using a Werner extruder, with a melt temperature of 215° C. The composition of the blends is reported in Table 1 below.

TABLE 1

| Example No. | 1 | Comp. 1 |
|---|---|---|
| PP-1 (weight %) | 85 | |
| PP-2 (weight %) | | 75 |
| PB-1 (weight %) | 15 | |
| EPR (weight %) | | 25 |

Note:
Comp. = Comparison.

The properties are listed in Table 2 below.

TABLE 2

| Example No. | | 1 | Comp. 1 |
|---|---|---|---|
| MFR | g/10 min. | 9.5 | 11.2 |
| PI | | 6.8 | 5.7 |
| HAZE on plaque 1 mm | % | 23.6 | 33.6 |
| Izod 0° C. | $kJ/m^2$ | 2.2 | 8.6 |
| Izod 23° C. | $kJ/m^2$ | 3.8 | 33.9 |
| MEF | MPa | 1210 | 830 |
| MET | MPa | 1380 | 920 |
| Tensile Strength at yield | MPa | 31.4 | 22.6 |
| Elongation at yield | % | 11.5 | 16.5 |
| Tensile Strength at break | MPa | 19.8 | 19.9 |
| Elongation at break | % | 800 | 780 |
| HDT | ° C. | 89.8 | 76.4 |

What is claimed is:

1. A polyolefin composition comprising:
   A) 75-85% by weight of a propylene homopolymer or copolymer having a haze value of 25% or less, a polydispersity index from 6 to 7.3, a flexural modulus value higher than 600 MPa, and melting temperature of 140° C. or higher; and
   B) 15-25% by weight of a butene-1 copolymer containing from 1.5 to 5.5% by weight of ethylene,
   the composition having:
      (i) a haze value of equal to or lower than 25%, measured on 1 mm thick specimens,
      (ii) a melt flow rate from 1 to 100 g/10 min, measured at 230° C. with a load of 2.16 kg, and
      (iii) a flexural modulus value in a range of between 830 and 1210 MPa.

2. The polyolefin composition of claim 1, wherein A) contains a clarifying agent selected from the group consisting of acetals of sorbitols, acetals of xylitols, and phosphate ester salts.

3. The polyolefin composition of claim 1, wherein A) is a propylene homopolymer.

4. The polyolefin composition of claim 1, wherein A) is a propylene copolymer containing from 0.5 to 15% by weight of comonomer(s).

5. The polyolefin composition of claim 1, wherein A) is a propylene copolymer containing one or more comonomers selected from ethylene and $CH_2=CHR$ α-olefins and R is a $C_2$-$C_8$ alkyl radical.

6. The polyolefin composition of claim 1, wherein A) comprises a xylene insoluble fraction equal to or greater than 85% by weight.

7. An injection molded article comprising the polyolefin composition of claim 1.

* * * * *